(12) United States Patent
Froehlich et al.

(10) Patent No.: US 6,191,516 B1
(45) Date of Patent: Feb. 20, 2001

(54) ELECTRIC MOTOR

(75) Inventors: Peter Froehlich, Buehl; Joerg Brandes, Baden - Baden Neuweier; Hans Kobschaetzky, Renchen, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/403,934

(22) PCT Filed: Nov. 6, 1998

(86) PCT No.: PCT/DE98/03238

§ 371 Date: Dec. 14, 1998

§ 102(e) Date: Dec. 14, 1998

(87) PCT Pub. No.: WO99/44273

PCT Pub. Date: Sep. 2, 1999

(30) Foreign Application Priority Data

Feb. 28, 1998 (DE) .............................................. 198 08 550

(51) Int. Cl.⁷ ................................................... H02K 21/12
(52) U.S. Cl. .............................. 310/156; 310/89; 310/91; 310/154; 310/261
(58) Field of Search .............................. 310/156, 89, 154, 310/91, 261

(56) References Cited

U.S. PATENT DOCUMENTS

| | | | |
|---|---|---|---|
| 5,160,867 | * 11/1992 | Niemela | 310/154 |
| 5,201,111 | * 4/1993 | Prohaska | 29/596 |
| 5,698,918 | * 12/1997 | Shinoda et al. | 310/89 |
| 5,925,950 | * 4/1993 | Lau | 310/68 B |
| 6,046,519 | * 4/2000 | Hanazumi et al. | 310/49 R |
| 6,058,594 | * 5/2000 | Neumann et al. | 29/596 |

* cited by examiner

*Primary Examiner*—Nestor Ramirez
*Assistant Examiner*—Than H Lam
(74) *Attorney, Agent, or Firm*—Ronald E. Greigg; Edwin E. Greigg

(57) ABSTRACT

An electric motor, including at least two permanent magnet segments disposed around a motor longitudinal axis, in which each permanent magnet segment has end faces extending in the direction of the motor longitudinal axis and is encompassed by two independent yoke ring segments that have a gap between them parallel to a symmetry plane extending through the motor longitudinal axis and the center of the permanent magnet segments in order to reduce the armature transverse field. In addition to the reduction of the armature transverse field, a weight reduction of the electric motor is also achieved. To this end, in a first region close to the end faces of the permanent magnet segments, the one-piece magnetically conductive yoke is provided with a larger cross section than in a second region close to the symmetry plane extending through the center of the permanent magnet segments. The construction is particularly suited for small electric motors, in particular d.c. motors that are excited by permanent magnets.

23 Claims, 11 Drawing Sheets

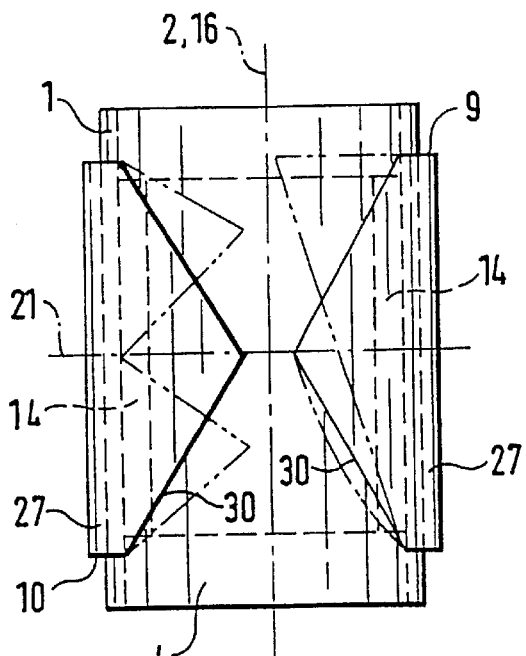
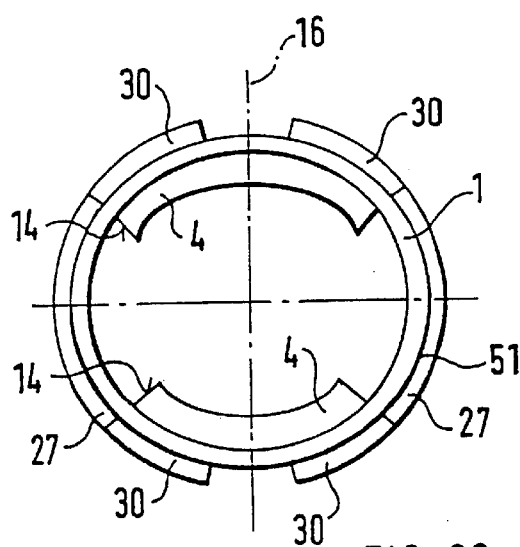
FIG. 19
FIG. 20
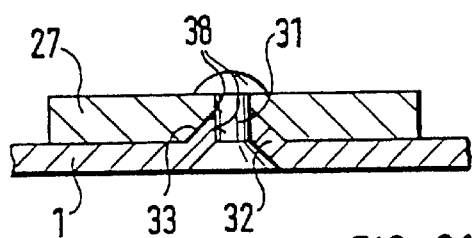
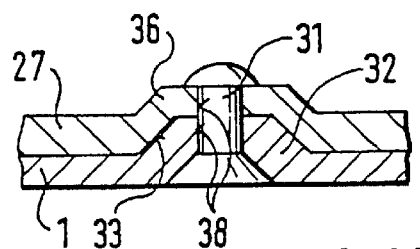
FIG. 21
FIG. 22
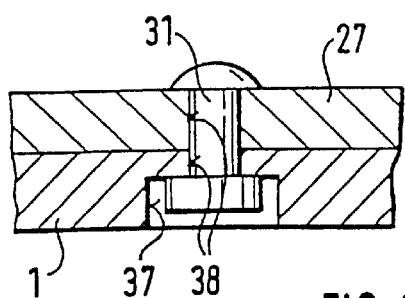
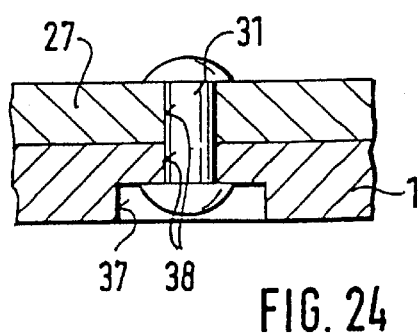
FIG. 23
FIG. 24

ELECTRIC MOTOR

PRIOR ART

The invention is based on an electric motor. An electric motor has already been disclosed (DE 26 37 705 A1) in which the magnetic yoke is comprised of two half shells which define an air gap between themselves, approximately in the middle of the permanent magnet segments. The armature transverse field, which reduces the efficiency of the electric motor, is weakened by air gaps of this kind.

ADVANTAGES OF THE INVENTION

The electric motor according to the invention, has the advantage over the prior art that in addition to a reduction of the armature transverse field to improve the efficiency of the electric motor, the material quantity for the magnetic yoke is reduced, which reduces the weight of the electric motor and reduces the material costs. This advantage of the electric motor according to the invention is based on the knowledge that in order to conduct magnetic field lines in the vicinity of a symmetry plane of the permanent magnet segments extending through the longitudinal axis of the motor, a significantly smaller flux cross-section is required for the magnetic field lines than between the permanent magnet segments viewed in the circumference direction.

It is particularly advantageous that in the second region disposed in the vicinity of the symmetry plane of the permanent magnet segments, the magnetic yoke has at least one recess, which extends in the direction of the motor longitudinal axis and in the radial direction and is embodied, for example, as trapezoidal, triangular, rhomboidal, oblong, elliptical, or the like. As a result, the material quantity and therefore the weight of the yoke is reduced in the second region and the resistance for the armature transverse field is increased.

It is likewise advantageous if the recess extends to an edge of the yoke.

It is furthermore advantageous if in the radial direction, in the first region close to the end faces of the permanent magnet segments, the yoke has a greater thickness than in the second region close to the symmetry plane of the permanent magnet segments, and the yoke is then bent into a ring or is embodied as a ring by means of deep drawing.

It is likewise advantageous if the yoke comprises a pole housing and a yoke ring encompassing the yoke, wherein the permanent magnet segments are disposed in the pole housing and the yoke ring has the first and second regions.

It is likewise advantageous if the yoke comprises a yoke ring and a pole housing that encompasses the yoke, wherein the permanent magnet segments are disposed in the yoke ring and the yoke ring has the first and second regions.

With yoke ring segments, it is also advantageous to permit the segment end faces, starting from a center plane that extends perpendicular to the motor longitudinal axis and symmetrically divides the yoke ring segments, to extend to an edge of the yoke ring segments with an increasing distance from the symmetry plane of the permanent magnet segments, wherein the segment end faces extend in a straight line or in a convex manner.

It is also advantageous if from a first edge to a second edge of the yoke ring segments, the segment end faces have a distance from the symmetry plane that increases extending in the direction of the motor longitudinal axis.

It is furthermore advantageous if from a first edge to a second edge of the yoke ring segments, the segment end faces have a distance from the symmetry plane of the permanent magnet segments which alternatingly increases and decreases extending in the direction of the motor longitudinal axis.

BRIEF DESCRIPTION OF THE DRAWINGS

Exemplary embodiments of the invention are shown in a simplified fashion in the drawings and will be explained in detail in the subsequent description.

FIGS. 19 and 20 show a tenth exemplary embodiment of a yoke embodied according to the invention, and FIGS. 21 to 45 show various types of connection of the pole housing and yoke ring segments.

DESCRIPTION OF THE EXEMPLARY EMBODIMENTS

Figure 1:
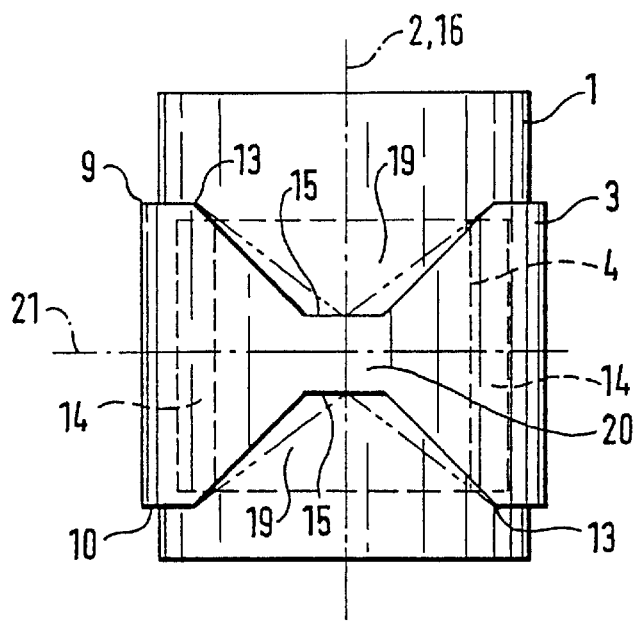
FIGS. 1 to 3 show a first exemplary embodiment of an electric motor with a yoke embodied according to the invention.
Figure 2:
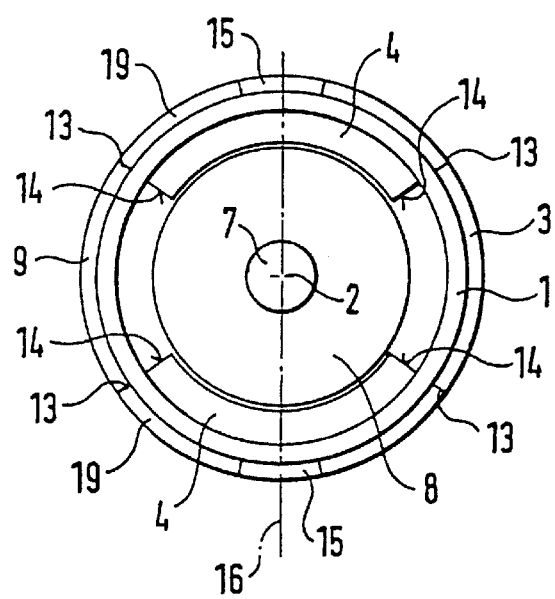

In FIG. 1, the numeral 1 is used to indicate a magnetically conductive pole housing of a d.c. motor excited by permanent magnets, which pole housing extends along a motor longitudinal axis 2 and, together with a magnetically conductive yoke ring 3 disposed on a pole housing 1, constitutes the magnetic yoke of the electric motor which is embodied as a d.c. motor. The yoke ring 3 is fixed securely and without an air gap onto the pole housing 1 and is either bent tightly around the cylindrical wall of the pole housing 1 as a sheet metal strip or is press-fitted onto the pole housing 1 as a closed ring. As can also be inferred from FIG. 2, the pole housing 1 supports at least two permanent magnet segments 4 against its inner wall, which, extending in a circular shape, partially encompass an armature 8, which is rotatably supported by means of a rotor shaft 7 and is only schematically indicated in the drawing, with circular, cylindrical pole surfaces. The armature 8 is provided with a number of grooves, not shown, for the insertion of an armature winding. The rotor shaft 7 is rotatably supported in end plates, not shown, which are comprised for example by means of covers, not shown, which radially enclose the pole housing 1. The yoke ring 3 is embodied as shorter than the pole housing 1 and extends from a first edge 9 to a second edge 10 along the motor longitudinal axis 2, wherein the permanent magnet segments 4 are embodied as shorter than the yoke ring 3 and are covered over by the yoke ring in the axial direction. FIG. 2 shows a top view of the electric motor according to FIG. 1.

Figure 3:
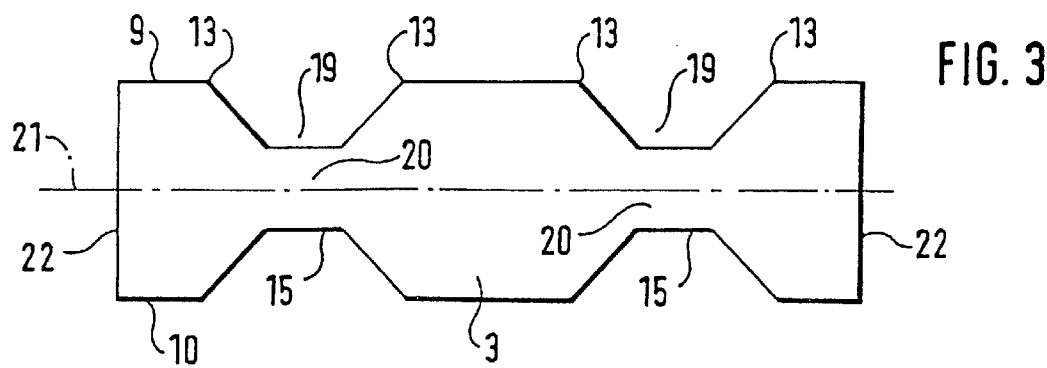
Figure 8:
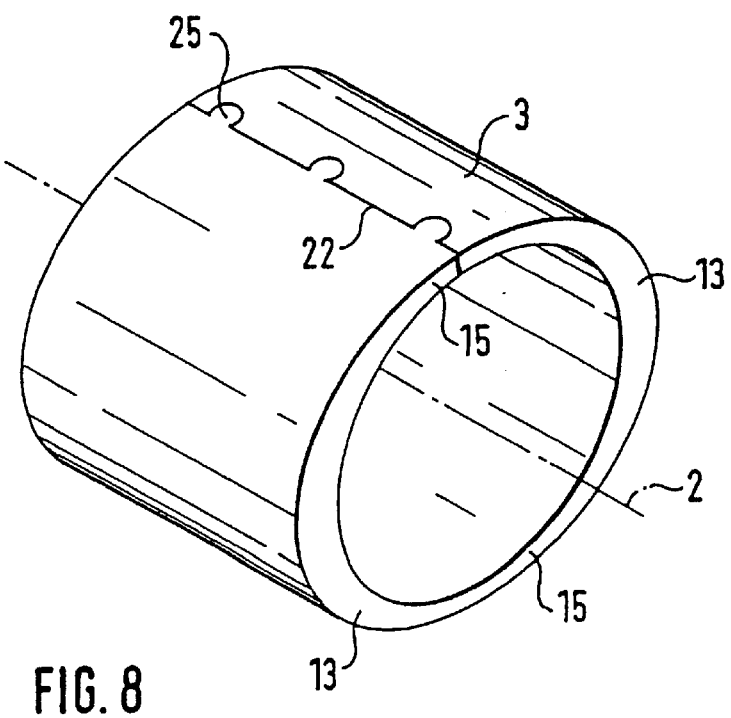

In order to reduce the armature transverse field and the weight of the yoke ring 3 and of the electric motor, according to a first exemplary embodiment, the yoke ring 3 is embodied of one piece and, in a first region 13 close to each end face 14 of the permanent magnet segments 4, is embodied with a larger cross section for conducting magnetic field lines than in a second region 15 close to a symmetry plane 16 extending through the motor longitudinal axis 2 and the center of each permanent magnet segment 4. The end faces 14 of the permanent magnet segments 4 extend in the direction of the motor longitudinal axis 2. In order to achieve the cross sectional reduction, in its second region 15, the yoke ring 3 has a recess 19, which extends in the direction of the motor longitudinal axis 2, which passes through the yoke ring 3 in the radial direction, and is open toward the edge 9 or 10, i.e. extends to the edge 9 or 10. In FIGS. 1 to 3, the recess 19 is embodied as trapezoidal and extends in a tapering fashion from both the edge 9 and the edge 10 to an intermediary piece 20 in the yoke ring, respectively symmetrical to the symmetry plane 16 of the permanent magnet segments 4. The recesses 19 and the intermediary piece 20 are thereby likewise disposed symmetrical to a center plane 21 that extends perpendicular to the motor longitudinal axis 2 and symmetrically divides the yoke ring 3. In the exemplary embodiment shown, the yoke ring 3 has four recesses 19, as is also shown in the developed view of the one-piece yoke ring 3 in FIG. 3. The sheet metal strip of the yoke ring 3, which is shown as a developed view in FIG. 3, can be bent into a ring, for example, and butt welded on its end faces 22 or attached by means of a dovetail joint as is shown in FIG. 8. As depicted in FIG. 1 by means of dot-and-dash lines, the recesses 19 can also be embodied as triangular.

Figure 4:
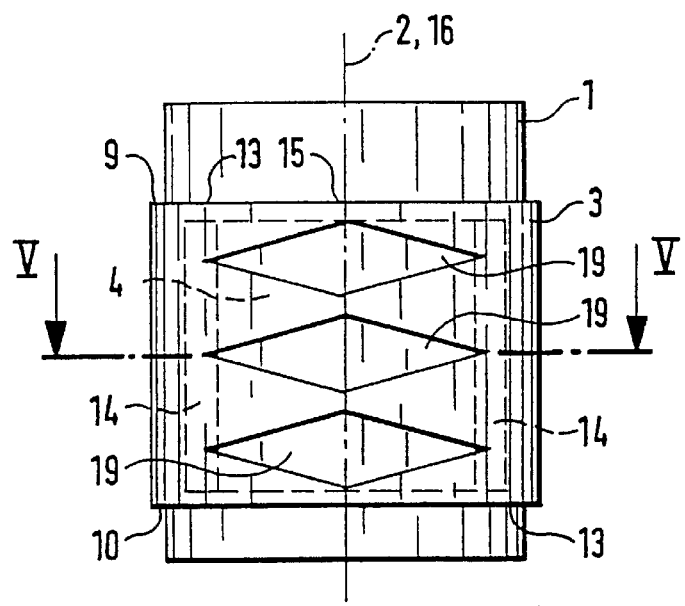
FIGS. 4 and 5 show a second exemplary embodiment of an electric motor with a yoke embodied according to the invention.
Figure 5:
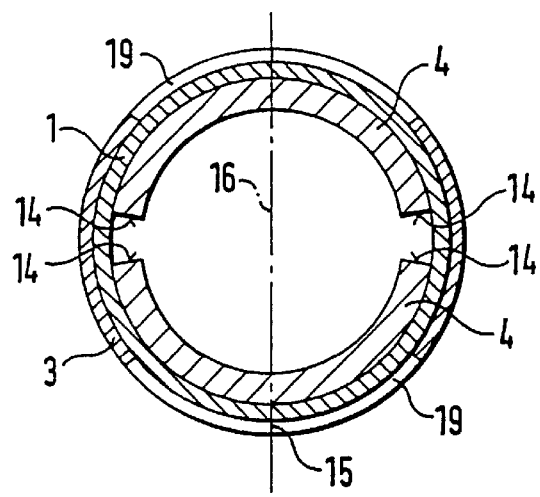

In the second exemplary embodiment according to FIGS. 4 and 5, as well as in the subsequent Figs., the parts that are the same and function in the same manner as those in the first exemplary embodiment according to FIGS. 1 to 3, are provided with the same reference numerals as in the FIGS. 1 to 3. FIG. 5 shows a section along the line V^V in FIG. 4. In the second exemplary embodiment according to FIGS. 4 and 5, in order to achieve a cross sectional reduction for the sake of weight reduction in the second region 15 of the yoke ring 3 and to reduce the armature transverse field in relation to the first region 13, at least one rhomboidal recess 19 is provided, which is disposed symmetrical to the symmetry plane 16 of each of the permanent magnet segments 4. In the second exemplary embodiment shown, three rhomboidal recesses 19 are shown in FIG. 4, which are disposed along the motor longitudinal axis 2, do not touch or intersect either one another or the edges 9 and 10, and extend in the circumference direction at most to the end faces 14 of the permanent magnet segments 4.

Figure 6A:
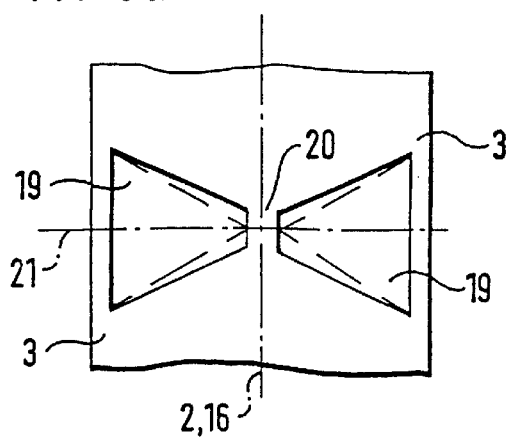
FIGS. 6a and 6b show a third and fourth exemplary embodiment of a yoke embodied according to the invention.

In a modification of the exemplary embodiment according to FIG. 4, FIG. 6a shows a yoke ring 3 in a partial depiction along the motor longitudinal axis 2, wherein symmetrical to the symmetry plane 16, at least two trapezoidally embodied recesses 19 or two triangular recesses 19 that are depicted by dashed lines are provided, which define an intermediary piece 20 between them. As in the exemplary embodiment according to FIG. 4, a number of recesses 19 can be disposed next to one another along the symmetry plane 16, which do not intersect either each other or the edges 9 and 10, and end before the first region 13.

Figure 6B:
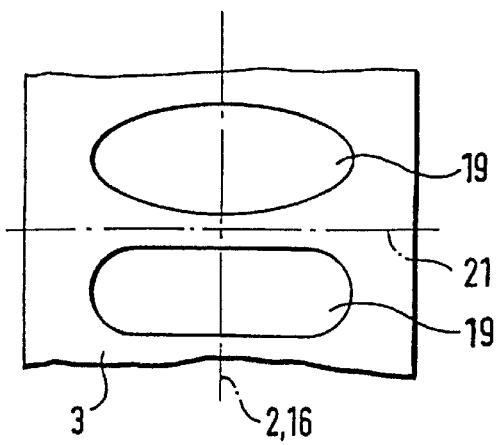

As a further variant of the exemplary embodiment according to FIG. 4, FIG. 6b shows that the recesses 19 can be embodied as oblong or elliptical openings which extend symmetrically and lateral to the symmetry plane 16.

Figure 7:
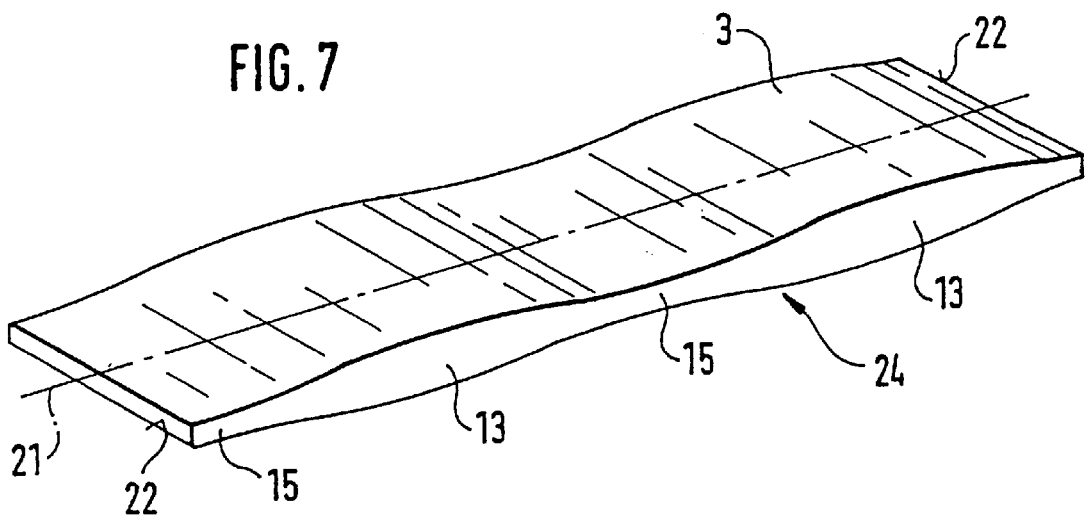
FIGS. 7 to 9 show a fifth exemplary embodiment of a yoke embodied according to the invention.
Figure 9:
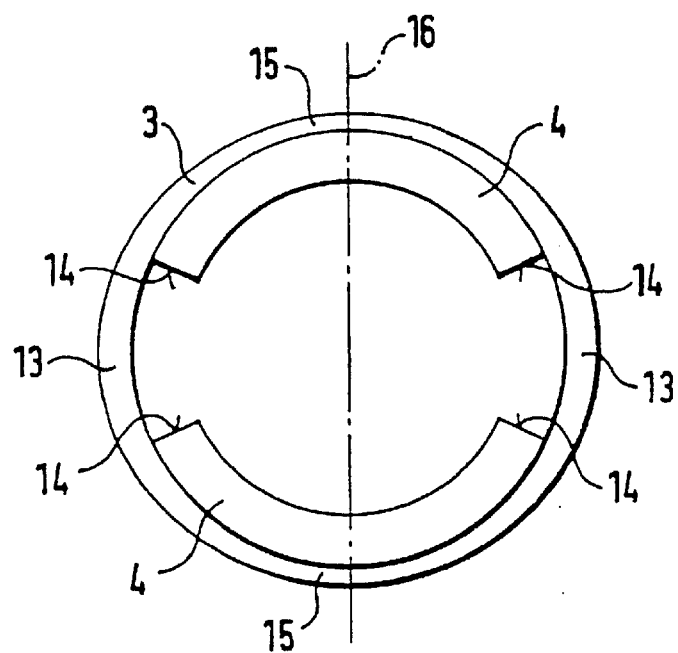

FIG. 7 shows the developed view of another exemplary embodiment of a yoke ring 3, which is made of a band material 24 that is produced with variable thickness, for example a rolled steel band or a plastic band that is provided with magnetically conductive particles. As is also shown in FIG. 8, the yoke ring 3 therefore has first regions 13, which have a greater cross section, i.e. are thicker in the radial direction than second regions 15, which are thinner in the radial direction than the first regions 13. The width perpendicular to the center plane 21 of the band 24 thereby remains uniform. The circular yoke ring 3 according to FIG. 8, which is bent out of the band 24 according to FIG. 7, has its end faces 22 anchored to one another, for example by means of welding or securing means which engage in one another, such as the dovetail-like securing means 25 shown in FIG. 4. FIG. 9 shows how, in the yoke ring 3 according to FIG. 8, the two permanent magnet segments 4 are disposed in such a way that the second regions 15 with a smaller radial thickness are disposed close to the symmetry plane 16, while the first regions 13 with a greater radial thickness are provided close to the end faces 14 of the permanent magnet segments 4.

Figure 10:
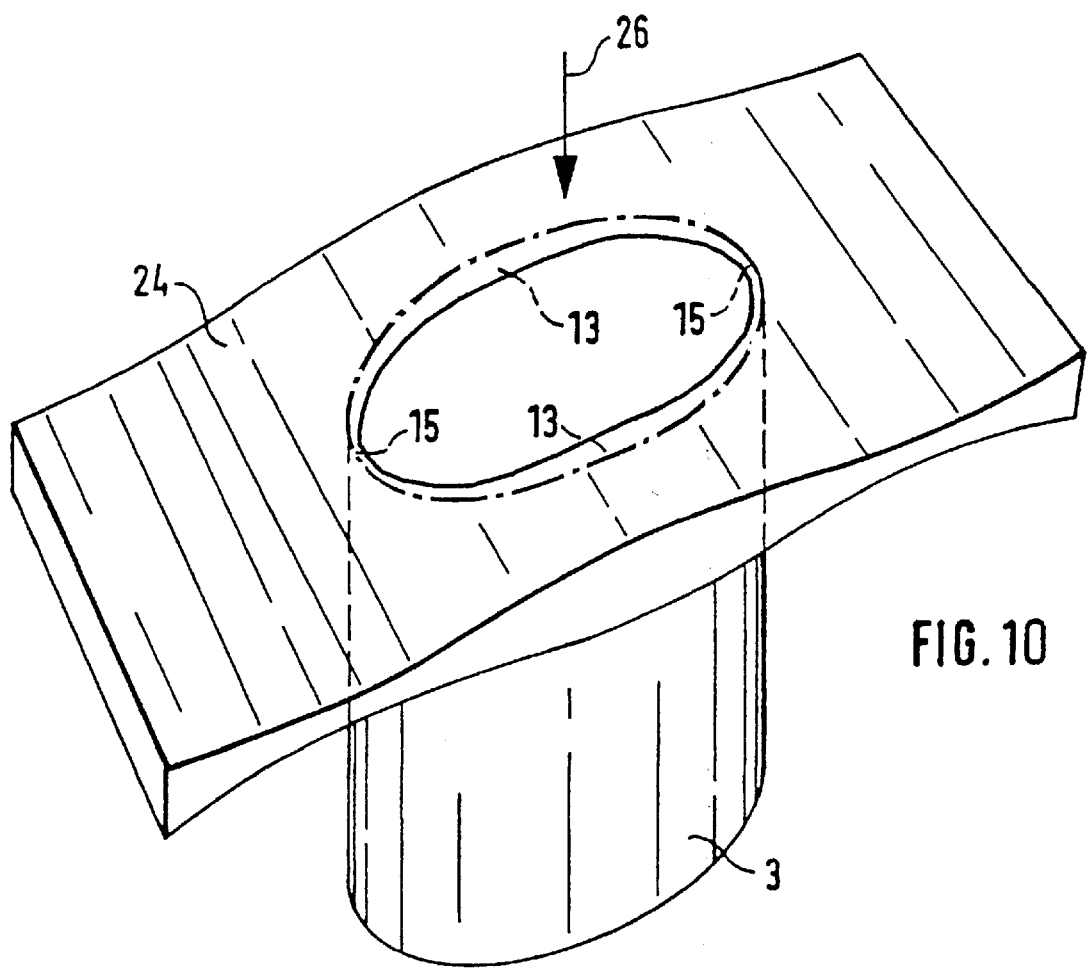
FIG. 10 shows a sixth exemplary embodiment of a yoke embodied according to the invention.

The exemplary embodiment according to FIG. 10 shows how a deep drawn yoke ring 3 is produced out of the band 24, which has an alternating variable thickness, by means of a deep drawing tool that is moved in the direction of the actuation arrow 26, and corresponding to the variable thickness of the band 24, the wall of this yoke ring 3 has the dot-and-dash course with first, thicker regions 13 and second, thinner regions 15.

Figure 11:
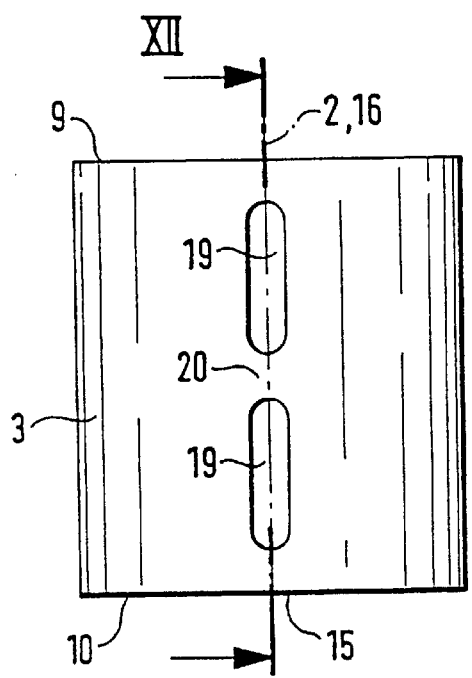
FIGS. 11 to 14 show a seventh exemplary embodiment of a yoke embodied according to the invention.
Figure 12:
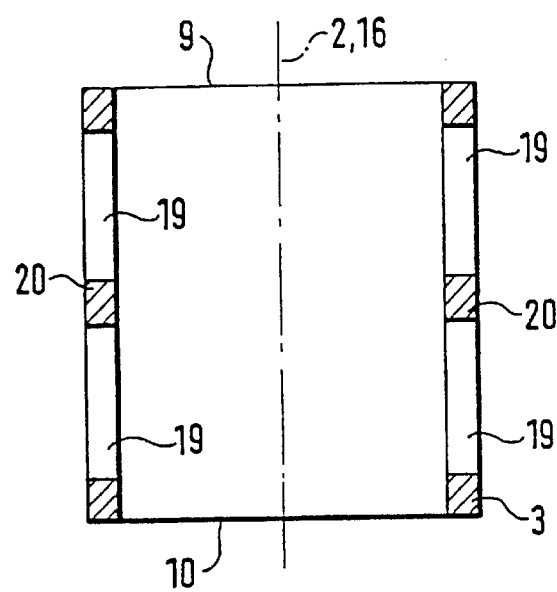
Figure 13:
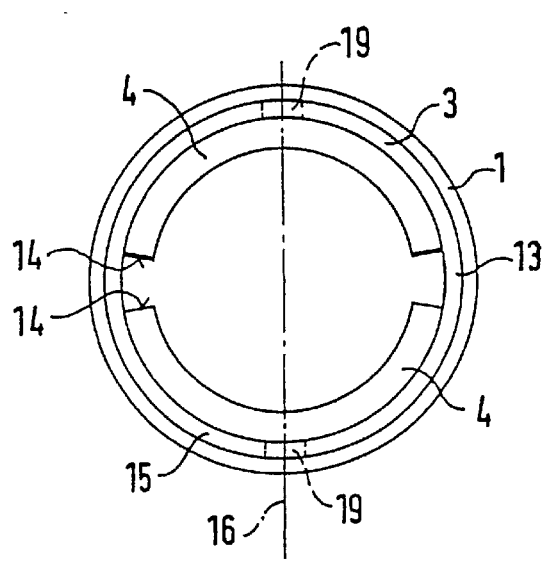
Figure 14:
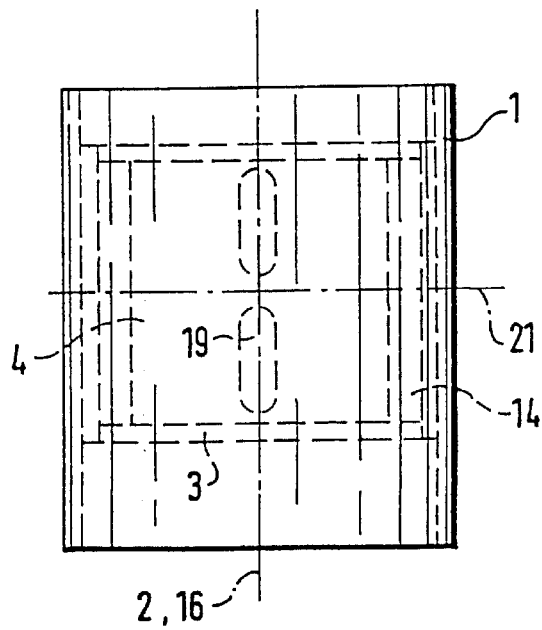

FIG. 11 shows a yoke ring 3 which has two recesses 19 that are arranged symmetrical to the symmetry plane 16 and are disposed one after the other in the direction of the motor longitudinal axis 2, and the longitudinal axes of these recesses extend in the direction of the motor longitudinal axis, form an intermediary piece 20 between them, and do not extend to the edge 9 or the edge 10. FIG. 12 shows a section along the line XII XII in FIG. 11 and FIG. 13 shows the disposition of a yoke ring 3 of this kind inside a pole housing 1, wherein the permanent magnet segments 4 are disposed on the inner wall of the yoke ring 3 so that the second regions 15 formed by the recesses 19 are disposed close to the symmetry plane 16. FIG. 14 shows a top view of the exemplary embodiment according to FIG. 13, wherein the yoke ring 3, which is embodied as shorter in the direction of the motor longitudinal axis 2, is disposed inside the pole housing 1, and the permanent magnet segments 4 are disposed in the yoke ring 3.

Figure 15:
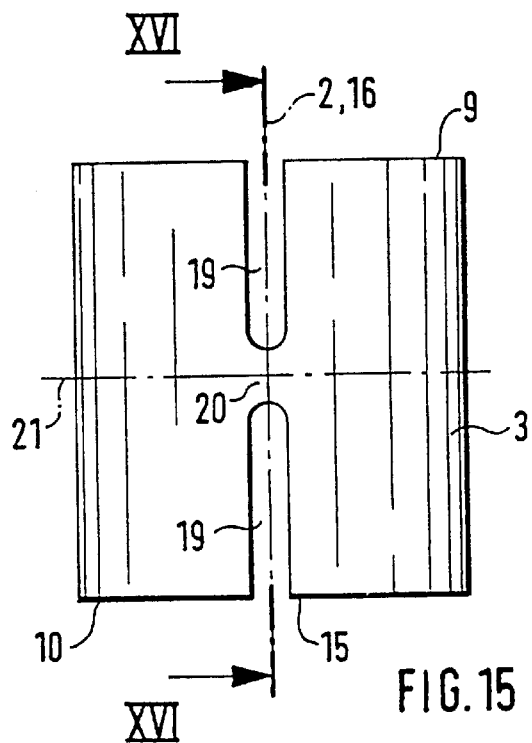
FIGS. 15 and 16 show an eighth exemplary embodiment of a yoke embodied according to the invention.
Figure 16:
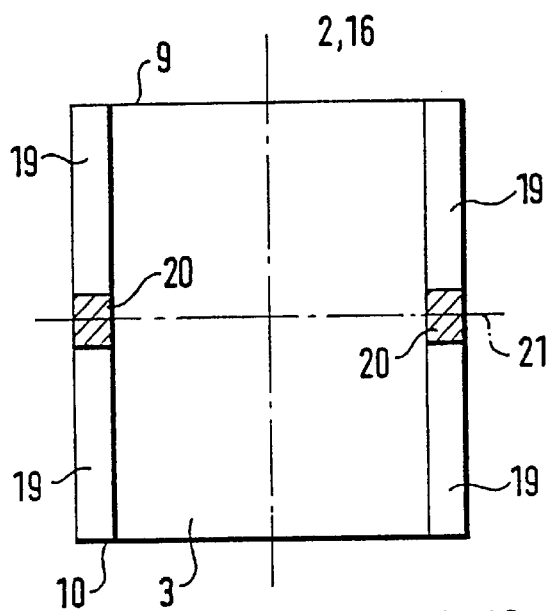

In a modification to the exemplary embodiment according to FIG. 11, FIG. 15 depicts a yoke ring 3 in which two oblong recesses 19 are provided, which are oriented symmetrical to the symmetry plane 16 and are oriented in the longitudinal direction along the direction of the motor longitudinal axis 2, which are divided in the vicinity of the center plane 21 by means of the intermediary piece 20 and extend either to the edge 9 or to the edge 10. FIG. 16 shows a section along the line XVI^XVI in FIG. 15.

Figure 17:
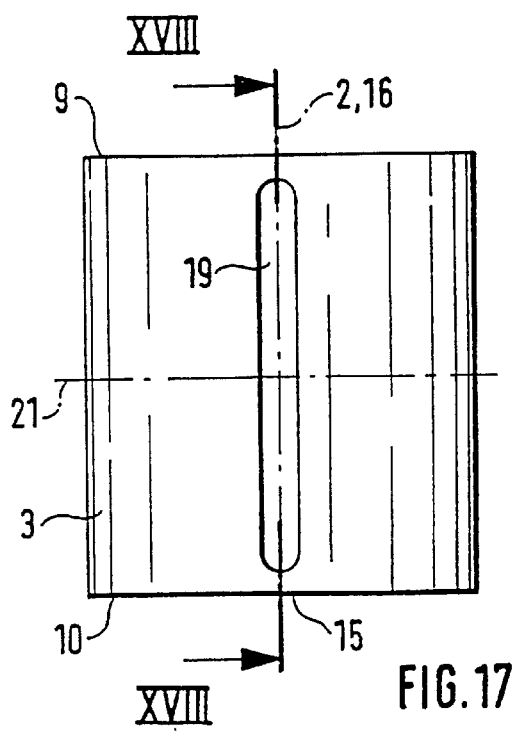
FIGS. 17 and 18 show a ninth exemplary embodiment of a yoke embodied according to the invention.
Figure 18:
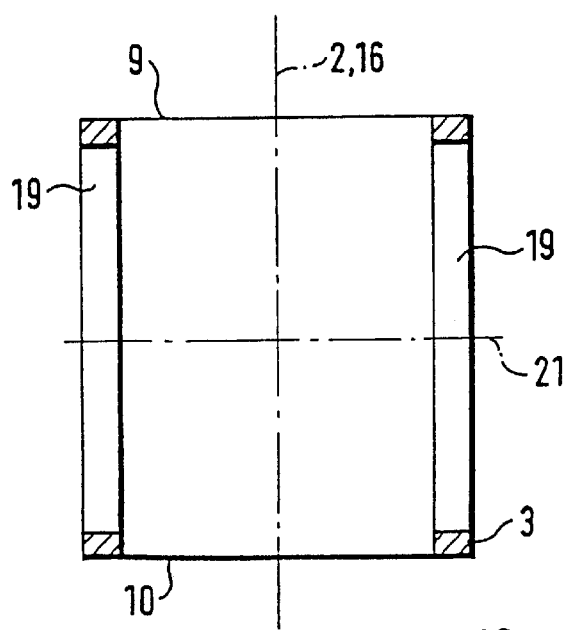

In a modification of the yoke ring according to FIG. 11, in FIG. 17, there is only one oblong recess 19 symmetrical to the symmetry plane 16 and in its longitudinal span, this recess extends along the motor longitudinal axis 2 and respectively ends before reaching the edge 9 or the edge 10. FIG. 18 shows a section along the line XVIII^XVIII in FIG. 17.

In contrast to the exemplary embodiment according to FIG. 1, in the exemplary embodiment according to FIG. 19, the recesses 19 are elongated toward one another along the motor longitudinal axis 2 until they intersect each other so that the yoke ring is divided into two yoke ring segments 27, which are placed onto the pole housing 1 and whose segments end faces 30 oriented toward the symmetry plane 16 extend with a distance from one another which changes in the direction of the motor longitudinal axis 2. With the segment end faces 30 depicted by solid lines in FIG. 19, the shortest distance from one another is achieved at the center plane 21 while the distance continuously increases toward the edge 9 or the edge 10 because of segment end faces 30 extending in a straight line that is inclined in relation to the motor longitudinal axis 2. In the right half of FIG. 19, a double-dot-and-dash line is used to show that the segment end faces 30 can likewise extend in a convex fashion from the center plane 21 to the edges 9 and 10 or that for example, starting from the edge 9, a segment end face 30 extends to the edge 10 with a uniform slope in relation to the motor longitudinal axis 2. In the left half of FIG. 19, a double-dot-and-dash line is used to show that the segment end faces 30 can have an alternating course from the edge 9 to the edge 10, which has a number of sequential larger and smaller distances to the symmetry plane 16. FIG. 20 shows a top view of the exemplary embodiment according to FIG. 19 with both of the yoke ring segments 27. The tubular pole housings 1 shown in the Figs. can also be embodied as cup-shaped in a manner not shown.

In FIGS. 21 to 45, various connection techniques are shown for connecting the yoke ring segments 27 to the pole housing 1. According to FIGS. 21 to 45, a disposition is shown in which the yoke ring segments 27 are disposed on the pole housing 1. The same connection possibilities naturally also apply for the reverse disposition when the yoke ring segments 27 are disposed inside the pole housing 1. FIGS. 21 to 25 show rivet connections, wherein the rivets shown can also be embodied as hollow rivets. In the exemplary embodiment according to FIGS. 21 and 22, rivets 31 are used that have a round head and a conical countersunk head, wherein the countersunk head is respectively contained inside a conical convexity 32 of the pole housing 1 and the convexity 32 protrudes partway into a conical recess 33 in the yoke ring segment 27, which in the exemplary embodiment according to FIG. 22 is constituted by a projection 36 in the yoke ring segment 27.

In the exemplary embodiments according to FIGS. 23 and 24, a recess 37 is provided in the pole housing 1 in which in the exemplary embodiment according to FIG. 23, a flat head of the rivet 31 is disposed and in the exemplary embodiment according to FIG. 24 a round head of this rivet is disposed, which rests against the yoke ring segment 27 with a round head. In the exemplary embodiments according to FIGS. 21 to 24, the rivets 31 respectively engage by way of through openings 38 in the pole housing 1 and in the yoke ring segment 27.

Figure 25:
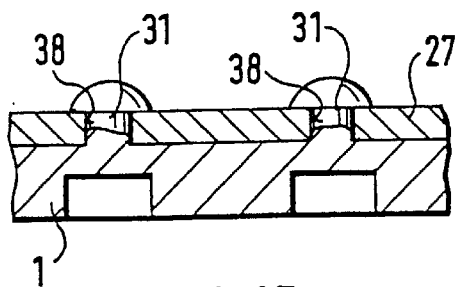
Figure 26:
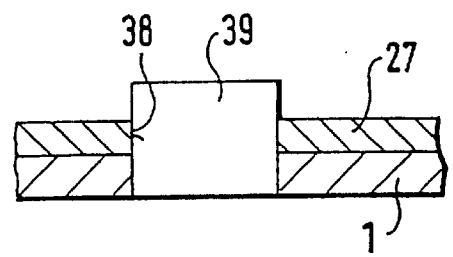

In the exemplary embodiment according to FIG. 25, through openings 38 are embodied in the yoke ring segment 27 and rivets 31, which are pressed out of the material of the pole housing 1, can pass through these through openings and, in the form of a direct riveting, round heads can be formed onto them after they pass through the through openings 38.

Figure 29:
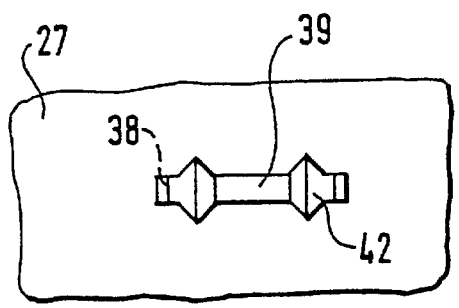
Figure 27:
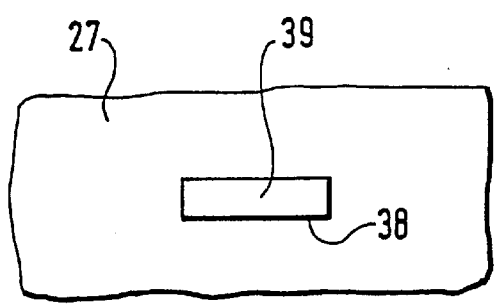
Figure 30:
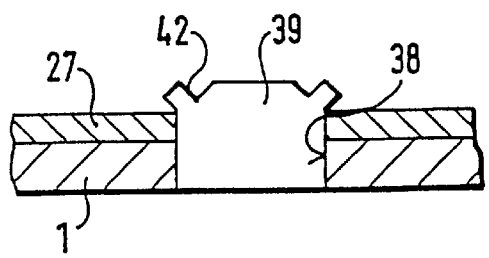
Figure 28:
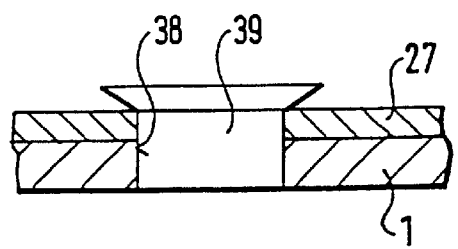

In the exemplary embodiments according to FIGS. 26 to 30, a riveting element 39 that is bent out from the pole housing 1 passes through the through opening 38 of the yoke ring segment 27. In this connection, FIG. 27 shows a top view of the exemplary embodiment according to FIG. 26 in the non-riveted state, while FIG. 28 shows the riveted state in which, through the application of force by means of a riveting tool, a flat rivet head that partially overlaps the yoke ring segment 27 is stamped onto the rivet element 39. FIG. 30 shows a rivet element 39, whose rivet head is deformed by means of indentations 42 so that parts of the rivet head overlap the yoke ring segment 27. FIG. 29 shows a top view of the exemplary embodiment according to FIG. 30, with the rivet head of the rivet element 39 that is deformed by means of the indentations 42.

Figure 31:
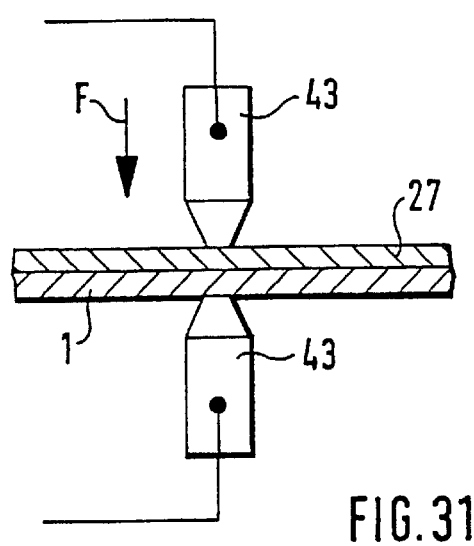
Figure 32:
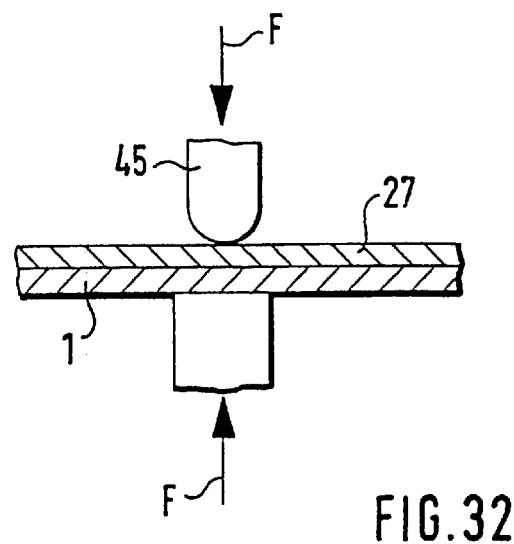
Figure 33:
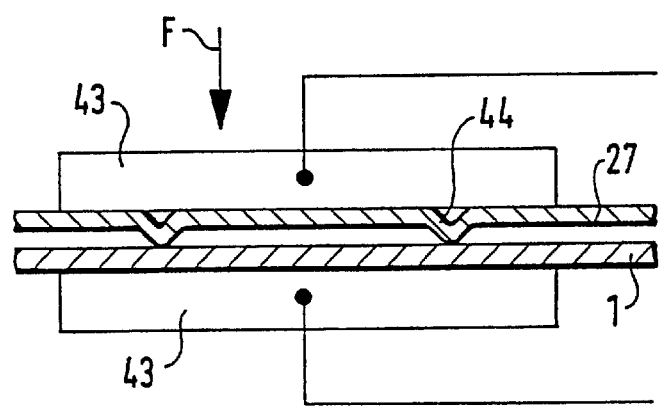

In the exemplary embodiments according to FIGS. 31 to 33, the connection of the pole housing 1 and the yoke ring segment 27 takes place by means of welding, for example by means of spot welding according to the exemplary embodiment in FIG. 31, wherein pointed electrodes 43 are pressed with a force F against the parts of the pole housing 1 and yoke ring segment 27 that rest against each other over a large area and current that is applied to the electrodes 43 causes the materials to melt in a spot shape due to the transition resistance. In so-called projection welding, according to FIG. 33, projections 44 are pressed for example into the yoke ring element 27 in the direction toward the pole housing 1 and, through the application of a force F and an electrical current by way of the flat electrodes 43, these projections are brought close to the melting temperature and are leveled out.

In the exemplary embodiment according to FIG. 32, the connection of the pole housing 1 and the yoke ring segment 27 is produced by ultrasonic welding by means of a so-called sonotrode 45.

Figure 34:
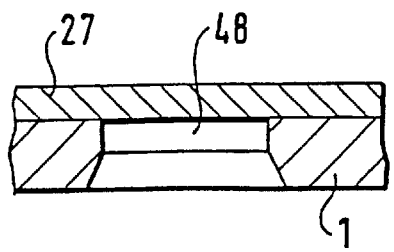
Figure 35:
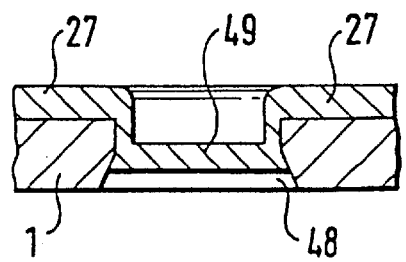

FIG. 34 shows a pole housing 1 with a securing opening 48 which widens out in the direction away from the yoke ring segment 27 and into which a cup-shaped securing element 49 is pressed by means of a joining process.

Figure 36:
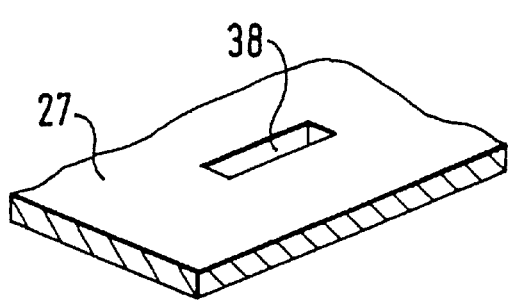
Figure 37:
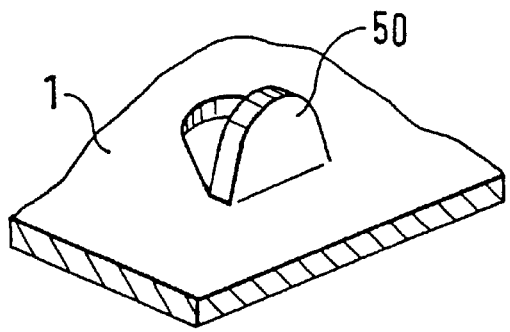
Figure 38:
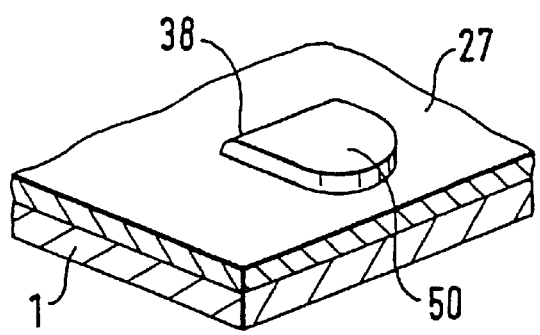
Figure 39:
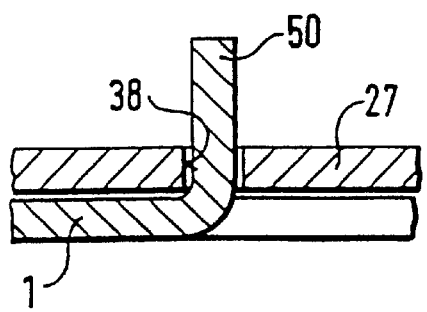
Figure 40:
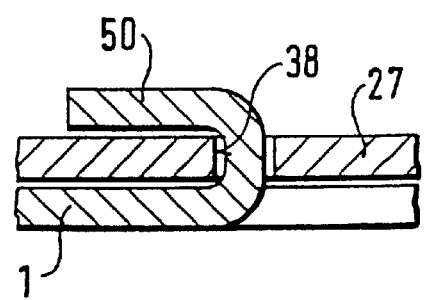

FIGS. 36 to 45 show connecting techniques between the pole housing 1 and the yoke ring segment 27, for example by means of bending elements embodied on the pole housing 1, for example in the form of tabs 50, which pass through the through openings 38 in the yoke ring segment 27 and are then bent over or twisted. FIG. 36 shows a yoke ring segment 27 with a rectangular through opening 38 and the tab 50 of a pole housing 1, which tab is shown in detail according to FIG. 37, is inserted through this rectangular through opening according to FIG. 38 and is bent over the surface of the yoke ring segment 27. FIG. 39 shows the tab 50 on the pole housing 1 passing through the through opening 38 of the yoke ring segment 27, while FIG. 40 shows the tab 50, which has been bent over and is resting against the surface of the yoke ring segment 27.

Figure 41:
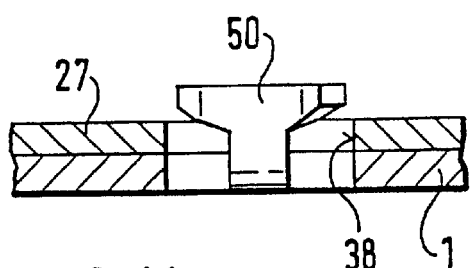
Figure 42:
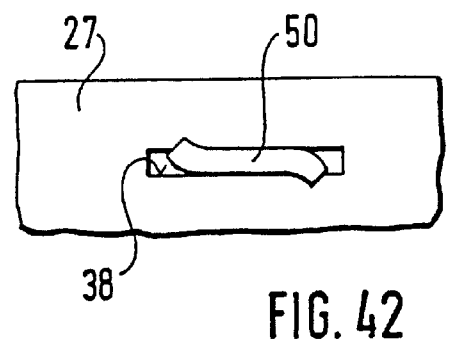
Figure 43:
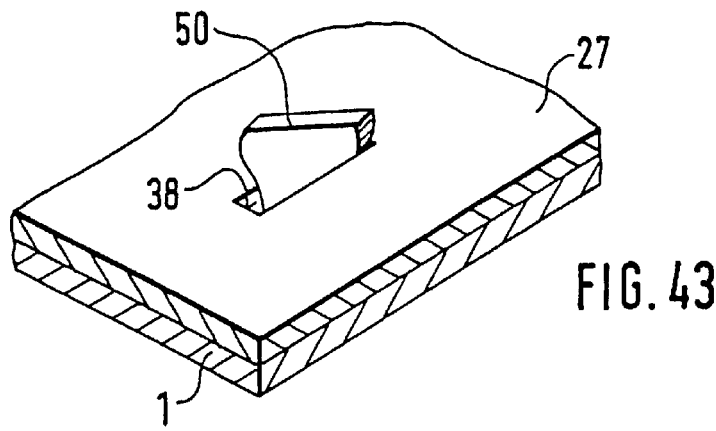

FIGS. 43 and 41 show the tab 50 of the pole housing 1, which reaches through the through opening 38 of the yoke ring segment 27 and is twisted on its protruding end and therefore partially overlaps the surface of-the yoke ring segment 27. FIG. 42 shows a top view of the yoke ring segment 27 with the twisted tab 50, which is embodied as T-shaped, as is clearly shown in FIG. 41.

Figure 44:
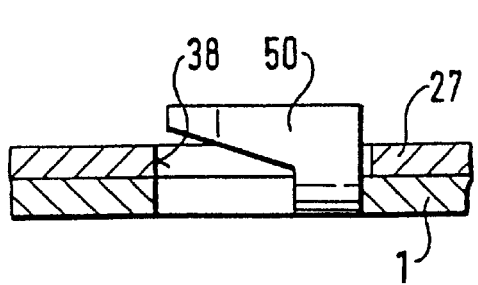
Figure 45:
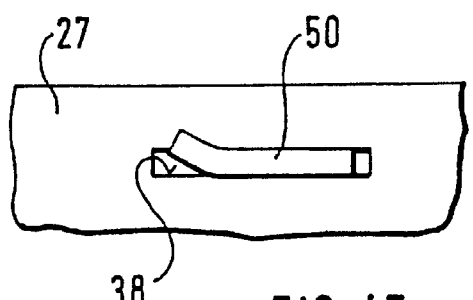

In the exemplary embodiment according to FIGS. 44 and 45, which show a top view of the yoke ring segment 27, the tab 50 is embodied approximately in the form of a right triangle and when twisted, engages with a tip over the surface of the yoke ring segment 27.

As shown in FIG. 20, the pole housing 1 and yoke ring segment 27 can also be connected to one another by means of an adhesive 51 introduced between the two, which can be embodied, for example, as a fluid adhesive or an adhesive foil.

The foregoing relates to a preferred exemplary embodiment of the invention, it being understood that other variants and embodiments thereof are possible within the spirit and scope of the invention, the latter being defined by the appended claims.

What is claimed is:

1. A direct current electric motor that is excited by permanent magnets comprising at least two permanent magnet segments (4) disposed around a longitudinal axis of the motor, each permanent magnet segment has two end faces respectively extending in a direction of the longitudinal axis (2) of the motor, at least one magnetically conductive yoke (3) which surrounds the housing and at least partially encloses the permanent magnet segments, in a first region (13) close to end faces (14) of the permanent magnet segments (4), the first region (13) of at least one magnetically conductive yoke (3) has a larger cross section for conducting magnetic field lines than in at least one second region (15) close to a symmetry plane (16) that extends through the longitudinal axis (2) of the motor and a center of at least one of the permanent magnet segments (4), and in the second region (15), the magnetically conductive yoke (3) has at least one recess (19) that extends in a direction of the longitudinal axis (2) of the motor and in the radial direction.

2. The electric motor according to claim 1, in which the recess (19) is embodied as trapezoidal.

3. The electric motor according to claim 2, in which the recess (19) extends to an edge (9, 10) of the yoke (3).

4. The electric motor according to claim 1, in which the recess (19) is embodied as triangular.

5. The electric motor according to claim 1, in which the recess (19) is embodied as rhomboidal.

6. The electric motor according to claim 1, in which the recess (19) is embodied as oblong or elliptical.

7. The electric motor according to claim 1, in which the magnetically conductive yoke is comprised of a pole housing (1) and a yoke ring encompassing the pole housing, wherein the permanent magnet segments (4) are disposed in the pole housing (1) and the yoke ring (3) includes the first region (13) and second region (15).

8. The electric motor according to claim 1, in which the magnetically conductive yoke is comprised of a yoke ring (3) and a pole housing (1) encompassing the yoke ring, wherein the permanent magnet segments (4) are disposed in the yoke ring (3) and the yoke ring (3) includes the first region (13) and second region (15).

9. An electric motor that is excited by permanent magnets, comprising at least two permanent magnet segments (4) disposed around a longitudinal axis (2) of the motor, in which each permanent magnet segment has two end faces respectively extending in a direction of the longitudinal axis (2) of the motor, and a magnetically conductive yoke (3) which is comprised of at least two yoke ring segments that at least partially encompass the permanent magnet segments and have segment end faces that are oriented toward a symmetry plane extending through the longitudinal axis of the motor and the center of the permanent magnet segments and are spaced apart from the symmetry plane, in which the yoke ring segment end faces (30) are disposed at a distance from the symmetry plane (16) and from each other that changes in a direction of the longitudinal axis (2) of the motor.

10. The electric motor according to claim 9, in which starting from a center plane (21), which extends perpendicular to the longitudinal axis (2) of the motor and symmetrically divides the yoke ring segments (27), the yoke ring segment end faces (30) extend to an edge (9, 10) of the yoke ring segments (27) with an increasing distance from the symmetry plane (16).

11. The electric motor according to claim 9, in which the yoke ring segment end faces (30) extend in a straight line.

12. The electric motor according to claim 9, in which the segment end faces (30) extend in a convex fashion.

13. The electric motor according to claim 9, in which extending in the direction of the longitudinal axis (2) of the motor from a first edge (9) to a second edge (10) of the yoke ring segments (27), the yoke ring segment end faces (30) have an increasing distance from the symmetry plane (16).

14. The electric motor according to claim 9, in which extending in the direction of the motor longitudinal axis (2) from a first edge (9) to a second edge (10) of the yoke ring segments (27), the yoke ring segment end faces (30) have an alternatingly increasing and decreasing distance from the symmetry plane (16).

15. The electric motor according to claim 9, in which the yoke ring segments (27) are connected to the pole housing (1) by means of rivets (31, 39).

16. The electric motor according to claim 9, in which the yoke ring segments (27) are connected to the pole housing (1) by means of welds.

17. The electric motor according to claim 9, in which the yoke ring segments (27) are connected to the pole housing (1)by means of bending elements (50).

18. The electric motor according to claim 9, in which the yoke ring segments (27) are connected to the pole housing (1) by means of joints.

19. The electric motor according to claim 9, in which the yoke ring segments (27) are connected to the pole housing (1) by means of adhesives (51).

20. A direct current electric motor that is excited by permanent magnets comprising at least two permanent magnet segments (4) disposed around a longitudinal axis of the motor, each permanent magnet segment has two end faces respectively extending in a direction of the longitudinal axis (2) of the motor, at least one magnetically conductive yoke (3) which surrounds the housing and at least partially encloses the permanent magnet segments, in a first region (13) close to end faces (14) of the permanent magnet segments (4), the at least one magnetically conductive yoke (3) has a larger cross section for conducting magnetic field lines than in at least one second region (15) close to a symmetry plane (16) that extends through the longitudinal axis (2) of the motor and a center of at least one of the permanent magnet segments (4), and in the radial direction, the magnetically conductive yoke (3) has a greater thickness in the first region (13) than in the second region (15).

21. The electric motor according to claim 20, in which the magnetically conductive yoke (3) is made of a band (24) with a variable thickness in a radial direction of the band.

22. The electric motor according to claim 21, in which the magnetically conductive yoke (3) is bent into a ring.

23. The electric motor according to claim 21, in which the magnetically conductive yoke (3) is embodied as a ring by means of deep drawing.

* * * * *

UNITED STATES PATENT AND TRADEMARK OFFICE
CERTIFICATE OF CORRECTION

PATENT NO. : 6,191,516 B1
DATED : February 20, 2001
INVENTOR(S) : Peter Froehlich et al.

It is certified that error appears in the above-identified patent and that said Letters Patent is hereby corrected as shown below:

<u>Title page,</u>
Item [86], should read as follows:

[86] PCT No.:     PCT/DE98/03238
    371 Date:     December 14, 1999
    102(e) Date:     December 14, 1999

Signed and Sealed this

Twenty-fifth Day of December, 2001

Attest:

*Attesting Officer*

JAMES E. ROGAN
*Director of the United States Patent and Trademark Office*